United States Patent
Sun et al.

(10) Patent No.: US 11,194,630 B2
(45) Date of Patent: Dec. 7, 2021

(54) GROUPED SHUFFLING OF PARTITION VERTICES

(71) Applicant: Microsoft Technology Licensing, LLC, Redmond, WA (US)

(72) Inventors: Jin Sun, Sammamish, WA (US); Shi Qiao, Bellevue, WA (US); Jaliya Nishantha Ekanayake, Redmond, WA (US); Marc Todd Friedman, Seattle, WA (US); Clemens Alden Szyperski, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1148 days.

(21) Appl. No.: 15/608,605

(22) Filed: May 30, 2017

(65) Prior Publication Data

US 2018/0349198 A1  Dec. 6, 2018

(51) Int. Cl.
*G06F 16/00* (2019.01)
*G06F 9/50* (2006.01)
(Continued)

(52) U.S. Cl.
CPC .......... *G06F 9/5061* (2013.01); *G06F 9/5066* (2013.01); *G06F 9/5077* (2013.01);
(Continued)

(58) Field of Classification Search
CPC .... G06F 9/5061; G06F 16/278; G06F 9/5066; G06F 9/5077; G06F 17/30864;
(Continued)

(56) References Cited

U.S. PATENT DOCUMENTS 7,779,041 B2   8/2010   Zurek
9,122,700 B2   9/2015   Grider et al.
(Continued)

FOREIGN PATENT DOCUMENTS

CN   104504266 A   4/2015

OTHER PUBLICATIONS

Mosharaf Chowdhury, et al, "Managing Data Transfers in Computer Clusters with Orchestra", Oct. 2011, Conference Paper in ACM SIGCOMM Computer Communication Review, DOI: 10.1145/2018436.2018448 • Source: DBLP, pp. 1-12.*
(Continued)

*Primary Examiner* — Ashish Thomas
*Assistant Examiner* — Suman Rajaputra
(74) *Attorney, Agent, or Firm* — Workman Nydegger

(57) ABSTRACT

Shuffling of into partitions by first grouping input vertices of a limited number. Each group of input vertices may then be simply shuffled into a corresponding group of intermediate vertices, such as by broadcasting. A second grouping occurs in which the intermediate vertices are grouped by partition. The intermediate vertices then shuffle into corresponding output vertices for the respective partitions of that group. If the intermediate vertices are still too large, then this shuffling may involve recursively performing the shuffling just described, until ultimately the number of intermediate vertices shuffling into the output vertices is likewise limited. Thus, the final shuffling into the output vertices might also be simply performed by broadcasting.

18 Claims, 12 Drawing Sheets

(51) Int. Cl.
  *G06F 16/27* (2019.01)
  *H04L 29/08* (2006.01)
(52) U.S. Cl.
  CPC ........ *G06F 16/278* (2019.01); *H04L 67/1097* (2013.01); *H04L 67/1031* (2013.01)
(58) Field of Classification Search
  CPC ......... G06F 30/30867; G06F 17/30011; H04L 67/1097; H04L 67/1031; G06Q 10/10; G06Q 30/02
  See application file for complete search history.

(56) References Cited

U.S. PATENT DOCUMENTS

| | | | |
|---|---|---|---|
| 9,229,718 | B2 | 1/2016 | Macy, Jr. et al. |
| 9,330,158 | B1* | 5/2016 | Xiao .................. H04L 67/1097 |
| 9,383,982 | B2 | 7/2016 | Zhang et al. |
| 2014/0044430 | A1* | 2/2014 | Dress .................. H04B 10/801 398/66 |
| 2014/0372438 | A1 | 12/2014 | Chandramouli et al. |
| 2015/0213109 | A1 | 7/2015 | Kassko et al. |
| 2015/0220530 | A1* | 8/2015 | Banadaki ............... G06F 16/90 707/723 |
| 2016/0179642 | A1* | 6/2016 | Cai ..................... G06F 11/2058 714/4.12 |
| 2017/0262551 | A1* | 9/2017 | Cho ........................ H04L 45/46 |

OTHER PUBLICATIONS

Chowdhury, et al., "Managing data transfers in computer clusters with orchestra", In ACM SIGCOMM Computer Communication Review, vol. 41, Issue 4, Aug. 15, 2011, pp. 98-109.
Dai, Jason, "Consolidating Shuffle Files in Spark", Retrieved from: http://issues.apache.org/jira/secure/attachment/12637642/ConsolidatingShuffleFilesinSpark.pdf, Jul. 3, 2013, 3 Pages.
"International Search Report and Written Opinion Issued in PCT Application No. PCT/US2018/029681", dated Jul. 9, 2018, 15 Pages.
Ryaza, et al., "Improving Sort Performance in Apache Spark: It's a Double—Cloudera Engineering Blog", Retrieved from: https://blog.cloudera.com/blog/2015/01/improving-sort-performance-in-apache-spark-its-a-double/, Jan. 14, 2015, 12 Pages.
White, Tom, "Hadoop: The Definitive Guide-Storage and Analysis at Internet Scale", By O'Reilly, Apr. 1, 2015, pp. 197-203.
Zadeh, et al., "CME 323: Distributed Algorithms and Optimization", In University Lecture of Spring 2015, Aug. 4, 2015, 6 Pages.
Gunawi, et al., "What Bugs Live in the Cloud?", In Usenix Magazine, vol. 40, Issue 4, Aug. 2015, pp. 33-39.
Grishchenko, Alexey, "Distributed Systems Architecture", https://0x0fff.com/spark-architecture-shuffle/, Published on: Aug. 24, 2015, 15 pages.
Nicolae, et al., "Towards Memory-Optimized Data Shuffling Patterns for Big Data Analytics", In 16th IEEE/ACM International Symposium on Cluster, Cloud and Grid Computing, May 16, 2016, pp. 409-412.
Gupta, Sumit, "Learning Real-time Processing with Spark Streaming", In Publication of Packt Publishing Limited, Sep. 28, 2015, 1 pages.
Lin, et al., "Design Patterns for Efficient Graph Algorithms in MapReduce", In Proceedings of the Eighth Workshop on Mining and Learning with Graphs, Jul. 24, 2010, pp. 78-85.
Zhao, et al., "Divide-and-conquer approach for solving singular value decomposition based on MapReduce", In Journal Concurrency and Computation: Practice & Experience, vol. 28, Issue 2, Feb. 2016, 21 pages.
"Apache Storm", http://storm.apache.org/releases/1.0.1/Tutorial.html, Retrieved on: Feb. 8, 2017, 16 pages.
Zang, et al., "Software-Defined Data Shuffling for Big Data Jobs with Task Duplication", In 45th International Conference on Parallel Processing Workshops, Aug. 16, 2016, pp. 403-407.

* cited by examiner

GROUPED SHUFFLING OF PARTITION VERTICES

BACKGROUND

Computing systems and associated networks have greatly revolutionized our world. The interconnection of such computing systems into networks has resulted in explosive growth in the ability to communicate data ushering in what is now called the "information age". The explosion continues with the advent of datacenters and cloud computing environments, in which robust amounts of processing resources can be applied against massive amounts of data. Such large amounts of data are often referred to as "big data".

A processing resource is often expressed in terms of a "vertex", which runs on a computing system (often called a "processing node") in a distributed environment, such as a cloud computing environment. When performing large computational jobs, there are typically innumerable vertices that run on large numbers of processing nodes in order to accomplish the computational job. Each vertex typically relies heavily on data in order to perform its portion of the overall computational job. In such environments, it is advantageous to move data around so that partitions of data are available at a convenient place for a vertex or vertices that may use the corresponding partition of data. This movement of data into appropriate partitions is often termed as "shuffling". For instance, shuffling is often performed by key based on value(s) of the key.

Conventionally, shuffling involves providing data from each input vertex that has access to data that is to be shuffled to each output vertex that is assigned to gather data for a particular partition. In big data environments, the number of input vertices can be extremely large. The number of output vertices can also be extremely large. When an output vertex has to read data from a large number of input vertices, there could increasingly be performance and reliability bottlenecks.

One conventional way to address this scalability challenge is to introduce an intermediate stage of multiple vertices that intermediates between the input vertices and the output vertices. An intermediate stage vertex will read from a reasonable number (less than all) of the input vertices. Each output vertex will read from a reasonable number (less than all) of the intermediate vertices. This improves reliability since any given vertex (and intermediate vertex or an output vertex) reads from a reasonable number of other vertices. Thus, reliability is improved.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the shuffling of data accessible by a first set of vertices (e.g., called herein "input vertices") into partitions corresponding to a second set of vertices (e.g., called herein "output vertices"). The input vertices are first assigned into groups. As an example, the input vertices might be assigned into groups of equal or approximately equal size with the size perhaps being equal to a configurable fan-in factor. Intermediate vertices are used, but each of the intermediate vertices corresponds to one of the groups of input vertices and also corresponds to multiple of the partitions. Each group of the input vertices has a corresponding set of intermediate vertices. Thus, intermediate vertices are also grouped as are the input vertices. For instance, the number of intermediate vertices might be the same as the number of input vertices in a group. Each of the partitions that are to result from the shuffling has a corresponding intermediate vertex for each group of first vertices.

This grouping of input vertices and pairing to corresponding groups of intermediate vertices represents a more judicious use of intermediate vertices, which number far less than the number of intermediate vertices used in conventional data shuffling. Furthermore, the shuffling scales well in that the number of intermediate vertices is approximately linear with the number of input and output vertices. This contrast with the prior art mechanism for using intermediate vertices in which the number of intermediate vertices is approximately quadratic with the number of input and output vertices.

For each group of input vertices, the data is shuffled from the input vertex into the corresponding set of intermediate vertices for that group of input vertices. Accordingly, each of the intermediate vertices in the corresponding set of intermediate vertices for that group of input vertices has data for its corresponding multiple partitions. This shuffling is quite efficient as each of the input vertices in the group may simply broadcast data to each of the corresponding intermediate vertices in that group.

A second level or grouping is then performed, this time by partition groups. Each group of intermediate vertices is grouped so that the intermediate partitions in a given group all have data for the same partition group (referred to hereinafter as a "like partition group"). The data from that partition group of intermediate vertices is then shuffled into each of multiple corresponding output vertices such that each output vertex has data for an assigned partition. If the number of intermediate vertices for a given partition group is below a certain number (e.g., a configurable fan-in number), then this shuffling might simply involve broadcasting. However, if the number of intermediate vertices is still too high (e.g., is still above a configurable fan-in number), then this shuffling may involve recursive performance of the method until the number of intermediate vertices shuffling data into the output vertices is at a tolerable level (e.g., is below a configurable fan-in number).

This method of shuffling controls the number of vertices that are shuffling into any given vertex to be below a certain level (e.g., below a configurable fan-in number). Accordingly, inefficiencies and reliability problems associated with having too much fan-in is reduced. Such inefficiencies include the allocation of significant memory in the receiving vertex to handle incoming data streams, the increased change that the receiving of the data stream for one or more transmitting vertices will fail resulting in the receiving vertex restarting the process, the exacerbation of merge operation bottlenecks, and so forth. This improved efficiency is accomplished even with the use of a more restricted number of intermediate nodes that scales approximately linearly with the number of input and output vertices. Thus, shuffling may be reliably and efficiently performed even on big data as the amount of data being shuffled increase more and more into the future.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
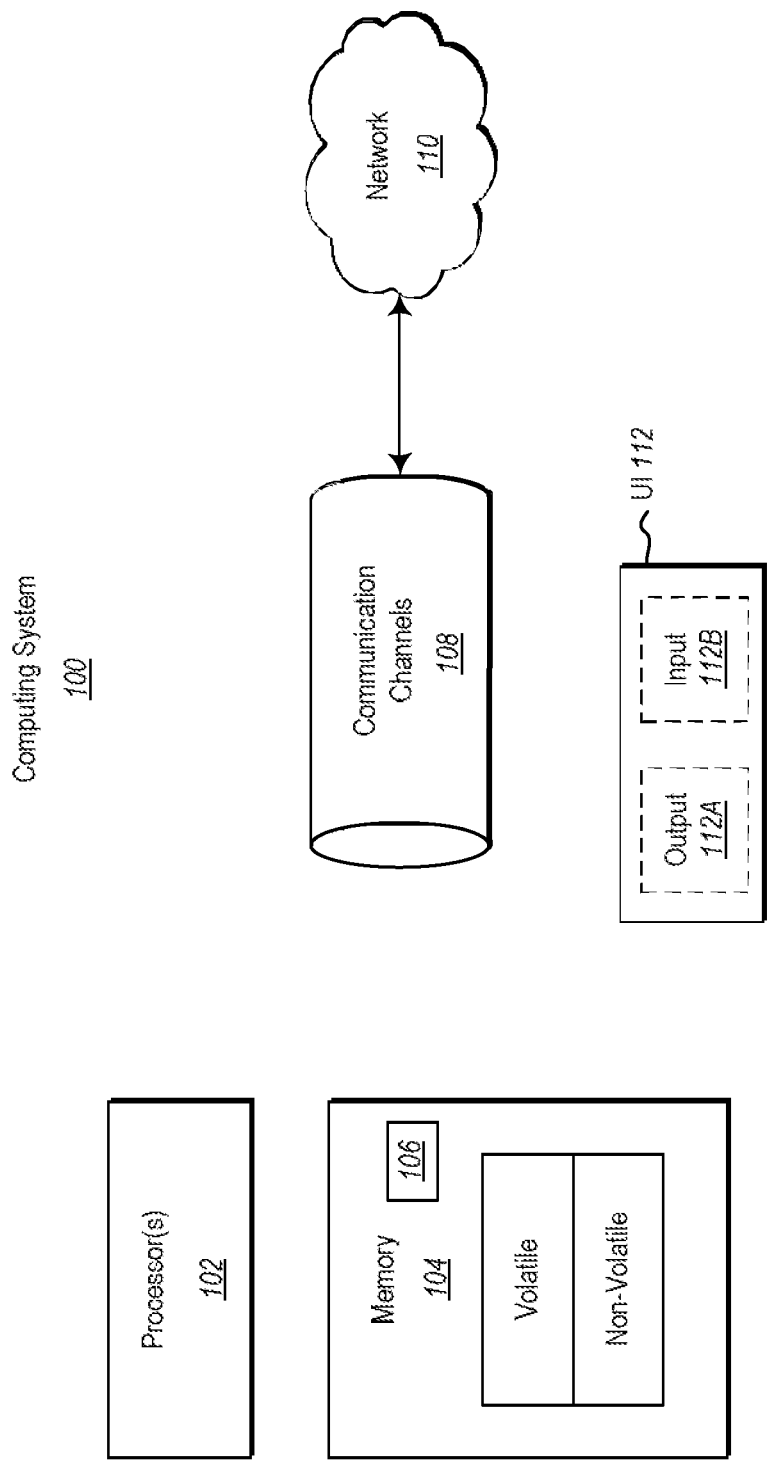
FIG. 1 illustrates an example computer system in which the principles described herein may be employed.

At least some embodiments described herein relate to the shuffling of data accessible by a first set of vertices (e.g., called herein "input vertices") into partitions corresponding to a second set of vertices (e.g., called herein "output vertices"). The input vertices are first assigned into groups. As an example, the input vertices might be assigned into groups of equal or approximately equal size with the size perhaps being equal to a configurable fan-in factor. Intermediate vertices are used, but each of the intermediate vertices corresponds to one of the groups of input vertices and also corresponds to multiple of the partitions. Each group of the input vertices has a corresponding set of intermediate vertices. Thus, intermediate vertices are also grouped as are the input vertices. For instance, the number of intermediate vertices might be the same as the number of input vertices in a group. Each of the partitions that are to result from the shuffling has a corresponding intermediate vertex for each group of first vertices.

This grouping of input vertices and pairing to corresponding groups of intermediate vertices represents a more judicious use of intermediate vertices, which number far less than the number of intermediate vertices used in conventional data shuffling. Furthermore, the shuffling scales well in that the number of intermediate vertices is approximately linear with the number of input and output vertices. This contrast with the prior art mechanism for using intermediate vertices in which the number of intermediate vertices is approximately quadratic with the number of input and output vertices.

For each group of input vertices, the data is shuffled from the input vertex into the corresponding set of intermediate vertices for that group of input vertices. Accordingly, each of the intermediate vertices in the corresponding set of intermediate vertices for that group of input vertices has data for its corresponding multiple partitions. This shuffling is quite efficient as each of the input vertices in the group may simply broadcast data to each of the corresponding intermediate vertices in that group.

A second level or grouping is then performed, this time by partition groups. Each group of intermediate vertices is grouped so that the intermediate partitions in a given group all have data for the same partition group (referred to hereinafter as a "like partition group"). The data from that partition group of intermediate vertices is then shuffled into each of multiple corresponding output vertices such that each output vertex has data for an assigned partition. If the number of intermediate vertices for a given partition group is below a certain number (e.g., a configurable fan-in number), then this shuffling might simply involve broadcasting. However, if the number of intermediate vertices is still too high (e.g., is still above a configurable fan-in number), then this shuffling may involve recursive performance of the method until the number of intermediate vertices shuffling data into the output vertices is at a tolerable level (e.g., is below a configurable fan-in number).

This method of shuffling controls the number of vertices that are shuffling into any given vertex to be below a certain level (e.g., below a configurable fan-in number). Accordingly, inefficiencies and reliability problems associated with having too much fan-in is reduced. Such inefficiencies include the allocation of significant memory in the receiving vertex to handle incoming data streams, the increased change that the receiving of the data stream for one or more transmitting vertices will fail resulting in the receiving vertex restarting the process, the exacerbation of merge operation bottlenecks, and so forth. This improved efficiency is accomplished even with the use of a more restricted number of intermediate nodes that scales approximately linearly with the number of input and output vertices. Thus, shuffling may be reliably and efficiently performed even on big data as the amount of data being shuffled increase more and more into the future.

Because the principles described herein operate in the context of a computing system, a computing system will be described with respect to FIG. 1. Then, the principles of shuffling will be described with respect to FIG. 2, with a first running example being demonstrated with respect to FIGS. 3A through 3G, and thereafter with a second running example being demonstrated with respect to FIGS. 4A through 4C.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
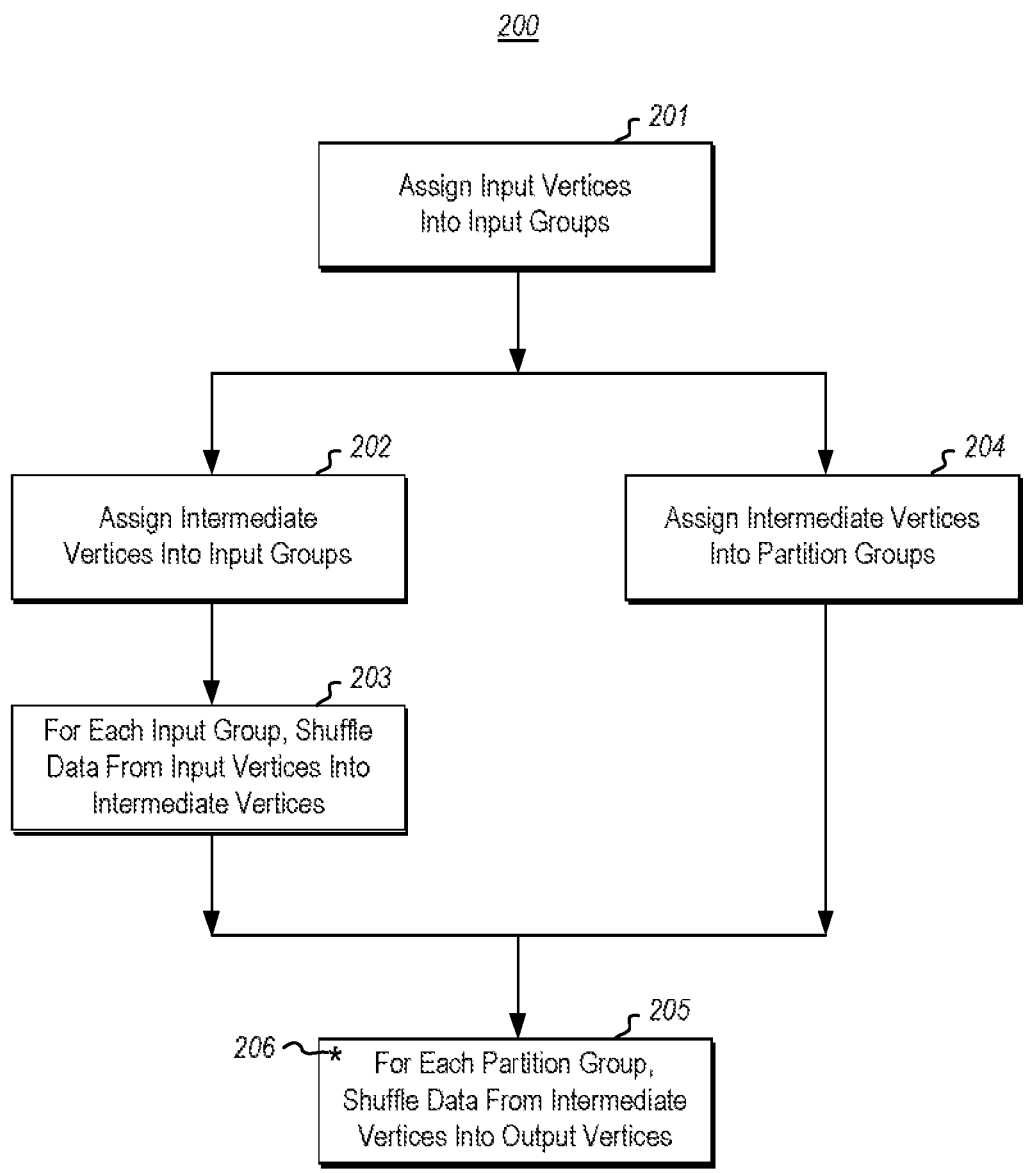
FIG. 2 illustrates a flowchart of a method for shuffling data accessible by a first set of vertices (e.g., "input vertices) into partitions corresponding to a second set of vertices (e.g., "output vertices")

FIG. 2 illustrates a flowchart of a method 200 for shuffling data accessible by a first set of vertices (e.g., "input vertices) into partitions corresponding to a second set of vertices (e.g., "output vertices"). Such is performed with the use of intermediate vertices. Each vertex may be, for instance, an executable component (such as the executable component 106 of FIG. 1) that is running on a computing system or processing node (such as the computing system 100 of FIG. 1).

The method 200 will be described with respect to a first running example that is illustrated with respect to FIGS. 3A through 3G. In the running example input vertices that have access to data to be shuffled are represented as upside down triangles, output vertices that gather the data for a partition will be represented as right-side up triangles. Intermediate vertices will be represented as circles.

The first running example is limited to only a few vertices so as to focus on the broader principles described herein without having drawings that illustrated extremely large numbers of vertices. For instance, in the first running example, there are twelve input vertices that have access to data that is to be partitioned, and eight output vertices that correspond to eight partitions. Thus, there are eight partitions resulting from the shuffling operation. In real cases, there may be hundreds, thousands, millions or even more input vertices and hundreds, thousands, millions or even more output vertices. Nevertheless, the principles as applied to the simple first running example may be applied to very large real life situations involving numerous input and output vertices.

Furthermore, in the first running example, there is a fan-in factor of 4. This limits the number of transmitting vertices that transmit data to a given receiving vertex to at most 4. The fan-in factor represents a satisfactory limit in fan-in and fan-out such that performance gains associated with limiting fan-in may be achieved. This fan-in factor is kept small for simplicity in describing the broader aspects described herein. Typical vertices can receive data streams from dozens and even well over a hundred transmitting vertices without suffering from intolerable performance degradation. Nevertheless, the principles as applied to the simple first running example may be applied to real life situations in which the number of input and output vertices, and the fan-in factor is much, much larger.

Figure 3A:
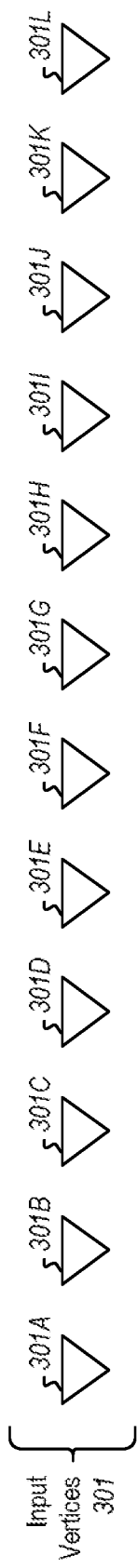
FIG. 3A through 3G illustrate a first running example described with respect to FIG. 2 in which there are twelve input vertices and eight output vertices.

FIG. 3A represents a beginning state of the running state in which twelve input vertices 301A through 301L (referred to collectively as "input vertices 301") are illustrated prior to being assigned into groups. Referring to FIG. 2, the method 200 begins by assigning the input vertices into input groups (act 201). This assignment may be made such that each of the input groups are of equal or approximately equal size. The size of the input groups may be determined by a fan-in factor, which fan-in factor may be configurable according to taste for tolerable levels of inefficiency caused by fan-in operations. The size may be, for instance, equal to or approximately equal to the configurable fan-in factor. In the running example, the configurable fan-in factor is four, and the size of the assigned groups of input vertices are limited to the fan-in factor of four.

Figure 3B:
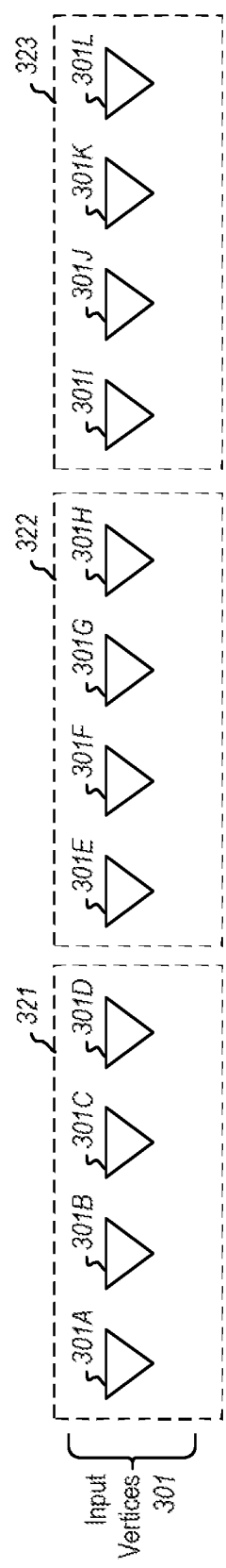

FIG. 3B illustrates a result of the assignment of the input vertices 301 into input groups. Vertices that are assigned to a given input group are illustrated as being more closely clustered together. For instance, input vertices 301A through 301D are assigned to input group 321, input vertices 301E through 301H are assigned to input group 322, and input vertices 301I through 301L are assigned to input group 323. Note that there are no more than four input vertices 301 in each input group. Such grouping does not mean that data is moved. However, there may be some controlling component that keeps track of which input vertex is in which input group.

Referring to FIG. 2, intermediate vertices are then assigned so as to be grouped according to the input groups (act 202). Specifically, each of the intermediate vertices corresponds to one of the groups of input vertices and also corresponds to multiple partitions. Each group of input vertices thus has a corresponding group of intermediate vertices. Furthermore, each of the particulars has a corresponding intermediate vertex within each of the group. In the running example, the number of intermediate vertices in a group is kept the same as the number of input vertices in that group.

Figure 3C:
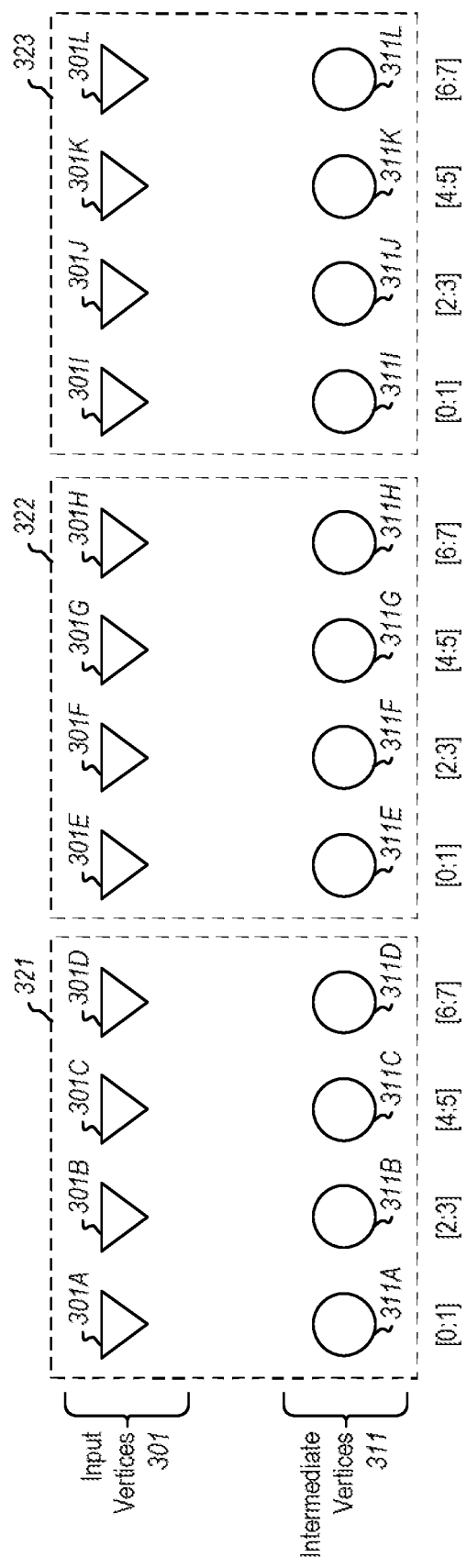

FIG. 3C illustrates the running example after the intermediate vertices (labelled collectively as intermediate vertices 311) having be established and assigned into input groups. Here, input group 321 is illustrated as including intermediate vertices 311A through 311D, input group 322 is illustrated as including intermediate vertices 311E through 311H, and input group 323 is illustrated as including intermediate vertices 311I through 311L. Intermediate vertices 311A, 311E and 311I are to gather data for two of the eight output partitions (e.g., partition 0 and 1). Intermediate vertices 311B, 311F and 311J are to gather data for another two of the eight output partitions (e.g., partitions 2 and 3). Intermediate vertices 311C, 311G and 311K are to gather data for another two of the eight output partitions (e.g., partitions 4 and 5). Intermediate vertices 311D, 311H and 311L are to gather data for the last two of the eight output partitions (e.g., partitions 6 and 7).

For each group of input vertices, the data is then shuffled from the input vertices of that input group into the corresponding intermediate vertices in that input group (act 203). In the running example, this shuffling is performed by each input vertex of a group broadcasting to all intermediate vertices in that group. Each intermediate vertex then finds the data for its partitions and gathers that data.

Figure 3D:
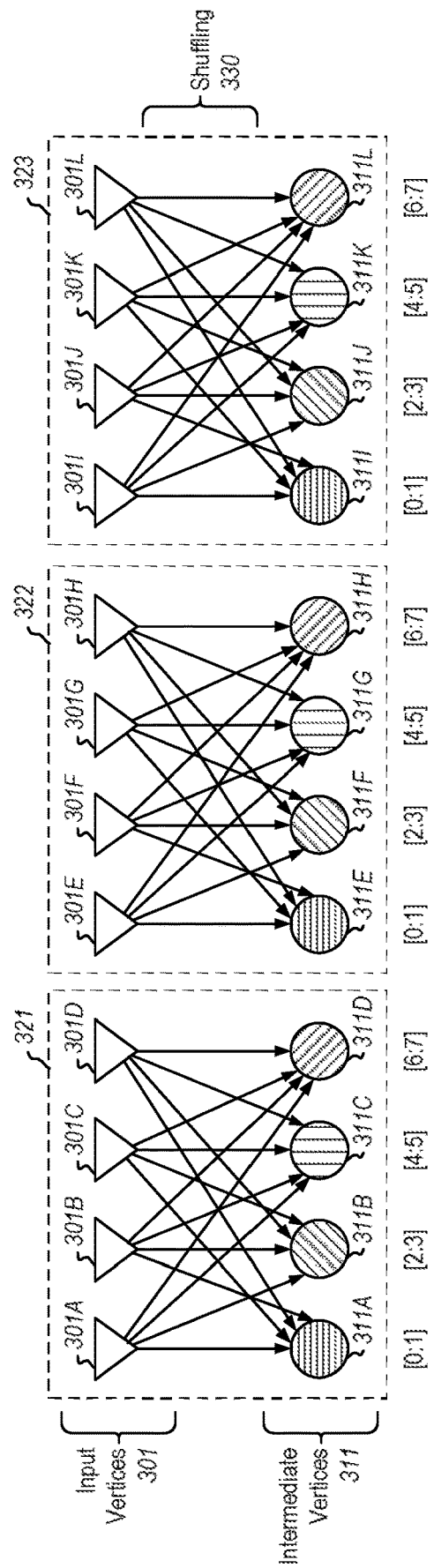

FIG. 3D illustrates the running example during and after this shuffling. The shuffling operation (e.g. involving broadcast) is represented by the arrows flowing from each input vertex to each intermediate vertex for each input group (as represented by the bracket 330). The fact that data of partitions 0 and 1 are now within the intermediate vertices 301A, 301E and 301I are symbolized by the intermediate vertices being filled with horizontal lines. The fact that data of partitions 2 and 3 are now within the intermediate vertices 301B, 301F and 301J are symbolized by the intermediate vertices being filled with rightward-leaning diagonal lines. The fact that data of partitions 4 and 5 are now within the intermediate vertices 301C, 301G and 301K are symbolized by the intermediate vertices being filled with vertical lines. The fact that data of partitions 6 and 7 are now within the intermediate vertices 301D, 301H and 301L are symbolized by the intermediate vertices being filled with leftward-leaning diagonal lines.

Referring to FIG. 2, there is a second grouping of intermediate vertices in which now the intermediate vertices are grouped by like set of multiple partitions (act 204). This second set of groups are called herein "partition groups". A partition group having a "like set of multiple partitions" means that the intermediate vertices contain the same partitions. This act is shown in parallel with act 202 in that the grouping may be assigned as early as when the intermediate nodes are established as assigned to their respective input groups. Thus, the controlling component may track two separate groupings for the intermediate nodes.

Figure 3E:
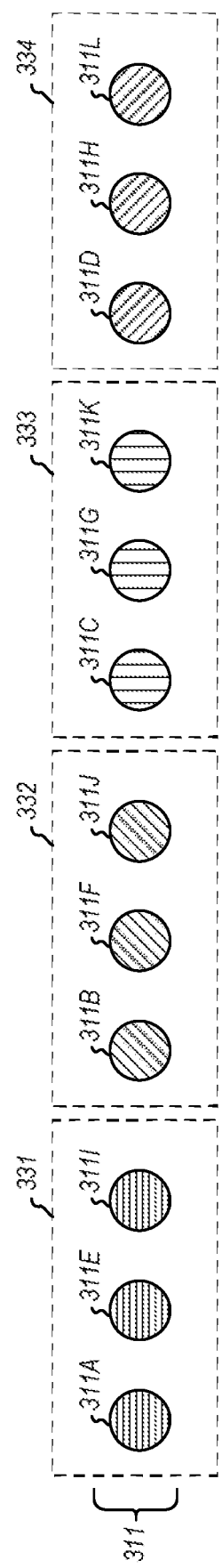

FIG. 3E shows the populated intermediate nodes 311 now grouped according to like partitions into partition groups. Intermediate vertices 311A, 311E and 311I are now grouped into partition group 331, which corresponds to partitions 0 and 1. Intermediate vertices 311B, 311F and 311J are now grouped into partition group 332, which corresponds to partitions 2 and 3. Intermediate vertices 311C, 311G and 311K are now grouped into partition group 333, which corresponds to partitions 4 and 5. Intermediate vertices 311D, 311H and 311L are now grouped into partition group 334, which corresponds to partitions 6 and 7.

Figure 3F:
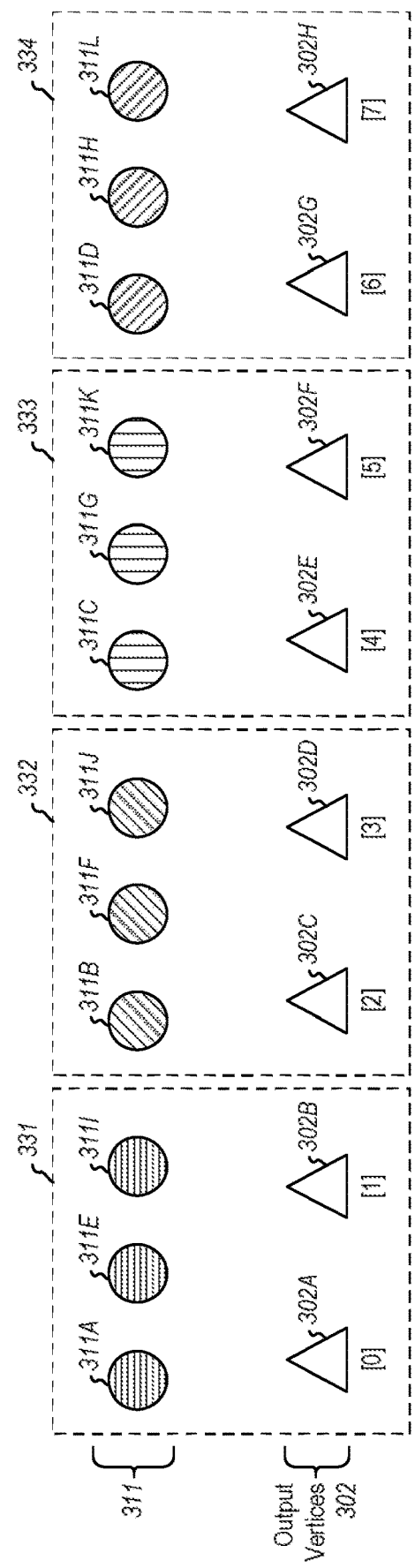

FIG. 3F is similar to FIG. 3E, example that now the corresponding output vertices (referring to collectively as output vertices 302) are shown ready to receive the data for their respective partitions. For instance, output vertex 302A is to gather data for partition 0 and is shown corresponding to the partition group 331, and output vertex 302B is to gather data for partition 1 and is also shown corresponding to the partition group 331. Likewise, output vertex 302C is to gather data for partition 2 and is shown corresponding to the partition group 332, and output vertex 302D is to gather data for partition 3 and is also shown corresponding to the partition group 332. Continuing, output vertex 302E is to gather data for partition 4 and is shown corresponding to the partition group 333, and output vertex 302F is to gather data for partition 5 and is also shown corresponding to the partition group 333. Furthermore, output vertex 302G is to gather data for partition 6 and is shown corresponding to the partition group 334, and output vertex 302H is to gather data for partition 7 and is also shown corresponding to the partition group 334.

Referring to FIG. 2, for each partition group, the data from each intermediate node of that partition group is then shuffled into the corresponding output vertex for that partition group (act 205). This may be accomplished by simply broadcasting the data from each intermediate node of that partition group to all output vertices for that partition group. The output partitions then just gathers the data for its corresponding partition. In some cases, this act 205 involves a recursive performance of the method 200 of FIG. 2. This possibility of act 205 being a possibly point of recursion is represented by act 205 having an associated asterisk 206. In the case of the first running example of FIGS. 3A through 3G, no recursion is performed. However, in the second running example of FIGS. 4A through 4D, recursion is performed at act 205.

Figure 3G:
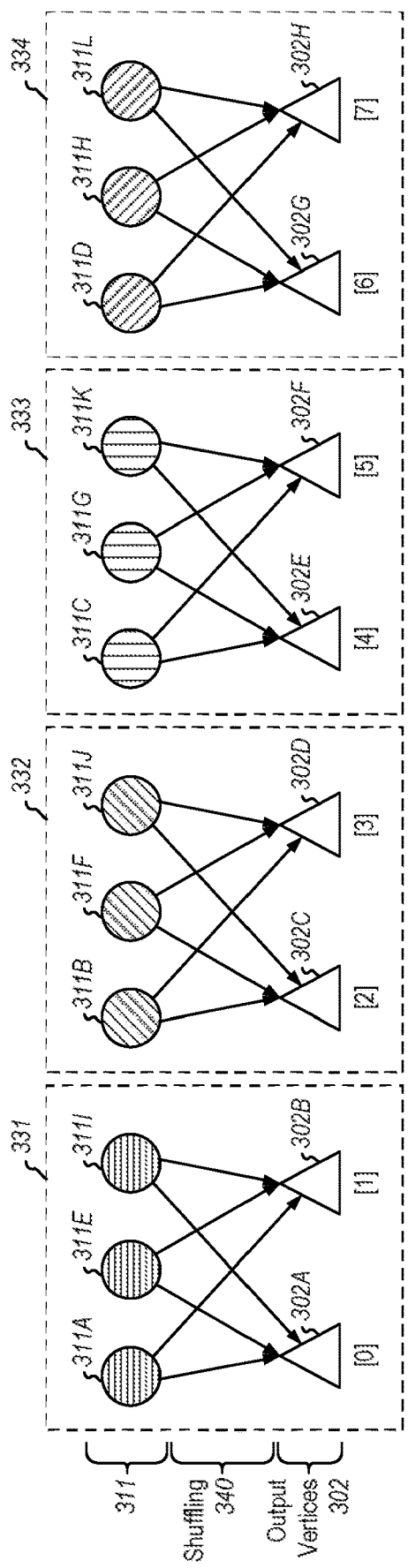

The result for the first running example is illustrated in FIG. 3G. The broadcasting of data for each partition group is represented by the arrows leading from the intermediate nodes to the output nodes as represented by the brackets 340. Thus, in this example, there are never more than four transmitting vertices for each receiving vertex.

In the first shuffling 330, there are four transmitting vertices transmitting into each receiving vertex. In the second shuffling 340, there are three transmitting vertices transmitting into each receiving vertex. Thus, the fan-in and fan-out is kept within the configurable fan-in limit (of four in the running example), resulting in efficiencies associated with limiting fan-in. Furthermore, the shuffling that did occur was broadcast shuffling, which is highly efficient since the transmitting vertices need not track which intermediate vertices they are transmitting to within any given input vertex group. In addition, the intermediate vertices have been limited to the number of input vertices, thereby alleviating any need to operate a number of intermediate vertices that significantly exceeds the number of input vertices.

In the first running example, the partition groups each show only three intermediate vertices. However, had there been more than the configurable fan-in factor (four in the first running example), then the method 200 may be performed in a second level of recursion in order to perform the act 205 of the second shuffling at the top level of recursion. The method 200 will now be described with respect to a second running example, which will involve two levels of recursion. In the second running example, there are forty-eight (48) input vertices, thirty-two (32) output vertices, and the fan-in factor is again 4.

The top level of recursion of the method 200 will now be described with respect to the second running example that illustrated with respect to FIG. 4A through 4C. As will be shown, in this second running example, the second level of recursion devolves into the first running example. In the second running example, there are forty-eight input vertices, thirty-two output vertices (corresponding to each of thirty-two partitions). Again, the method 200 begins by assigning the input vertices into groups (act 201).

Figure 4A:
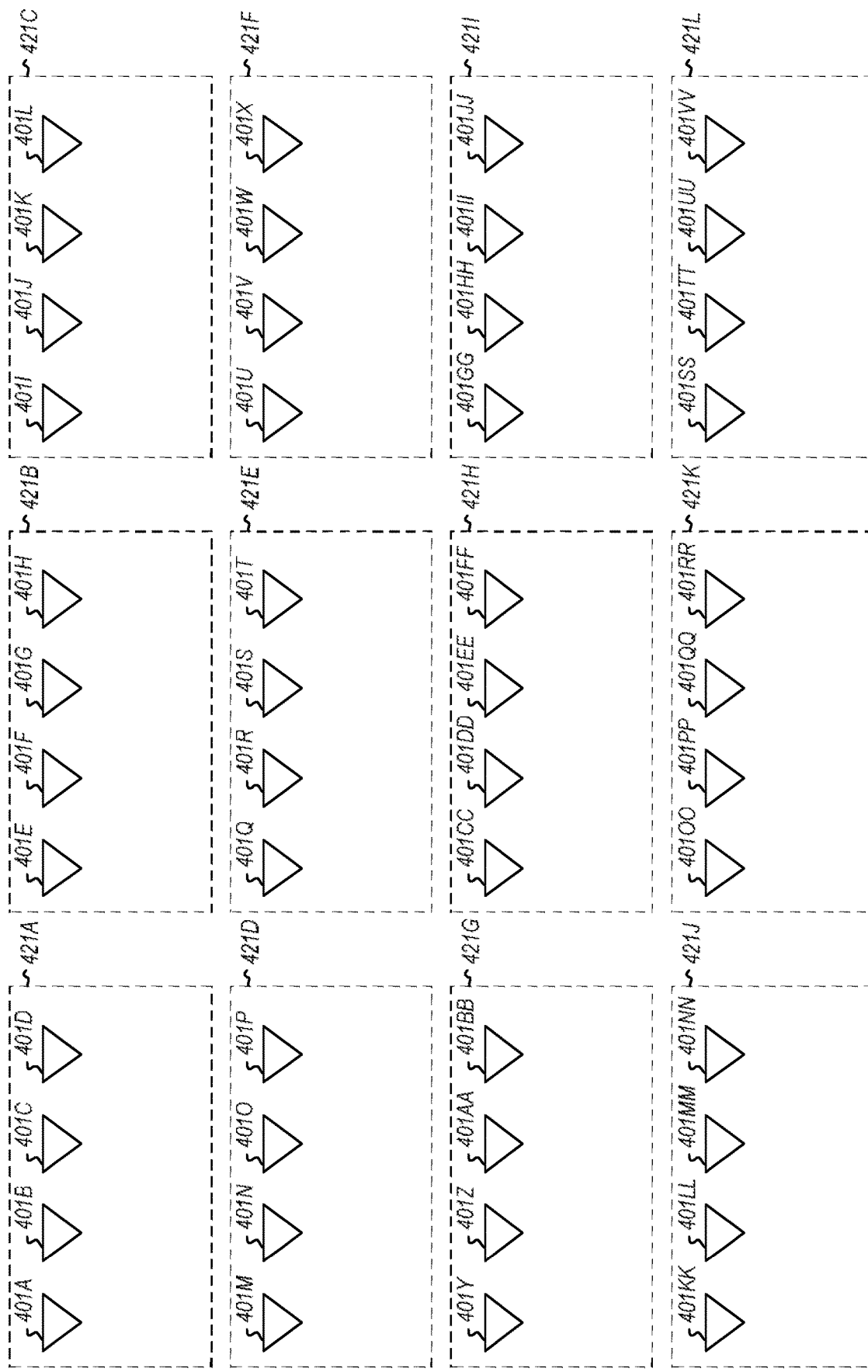
FIG. 4A through 4C illustrate a second running example described with respect to FIG. 2 in which there are forty-eight input vertices and thirty-two output vertices, which two levels of recursion being performed on the method, with the second level of recursion devolving into the first running example for each partition group at the first level of recursion.

FIG. 4A illustrates a result of the assignment of the input vertices into input groups. There are twelve input groups 421A through 421L, each containing four input vertices. There are forty-eight input vertices 401A to 401VV (collectively referred to as input vertices 401). Referring to FIG. 2, there are then assigned intermediate vertices that are grouped according to the input groups (act 202).

Figure 4B:
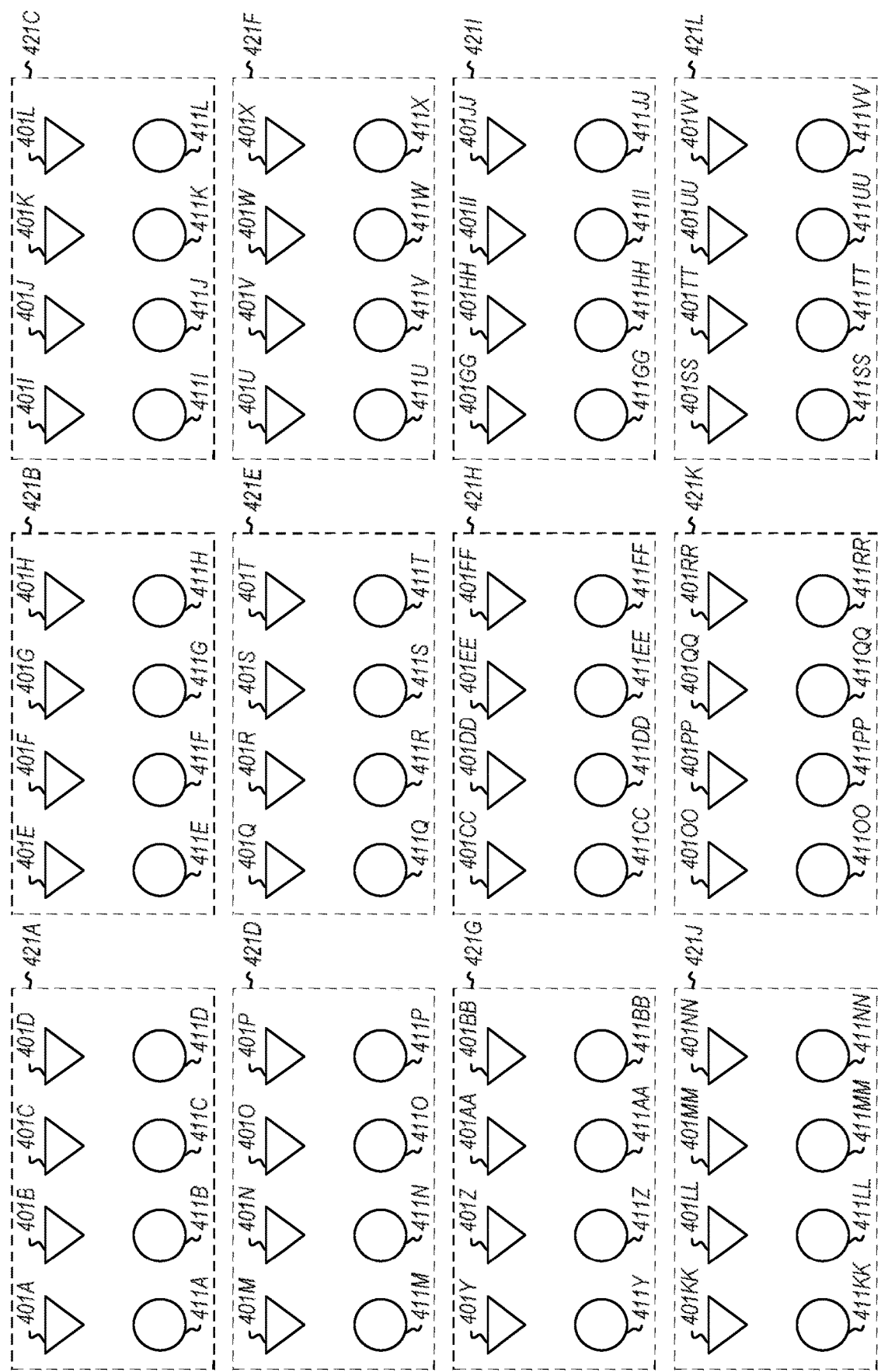
Figure 4C:
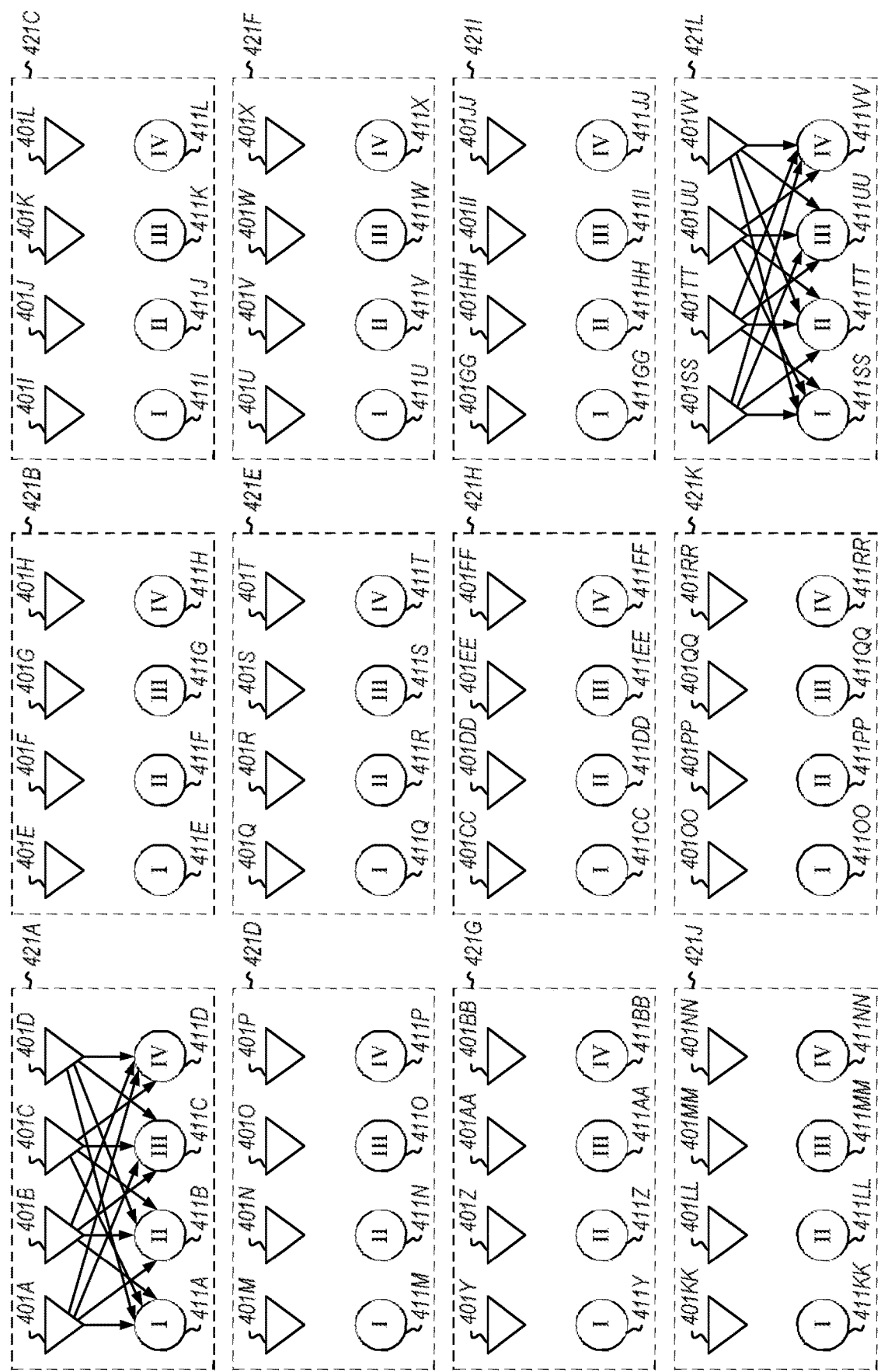

FIG. 4B illustrates the second running example after the intermediate vertices having be assigned into input groups. Note that each input group 421A through 421L now has four input vertices and four intermediate vertices. The intermediate vertices are labelled 411A through 411VV (referred to collectively as intermediate vertices 411).

The left-most intermediate vertices 411A, 411E, 411I, 411M, 411Q, 411U, 411Y, 411CC, 411GG, 411KK, 411OO and 411SS (collectively, "the intermediate vertices of the first partition group") in each input group are to gather data for eight of the output partitions (e.g., partition 0 to 7). The next intermediate vertices 411B, 411F, 411J, 411N, 411R, 411V, 411Z, 411DD, 411HH, 411LL, 411PP and 411TT (collectively, "the intermediate vertices of the second partition group") in each input group are to gather data for the next eight of the output partitions (e.g., partition 8 to 15). The third intermediate vertices 411C, 411G, 411K, 411O, 411S, 411W, 411AA, 411EE, 411II, 411MM, 411QQ and 411UU (collectively, "the intermediate vertices of the third partition group") in each input group are to gather data for the next eight of the output partitions (e.g., partition 16 to 23). The right-most intermediate vertices 411D, 411H, 411L, 411P, 411T, 411X, 411BB, 411FF, 411JJ, 411NN, 411RR and 411VV (collectively, "the intermediate vertices of the fourth partition group") in each input group are to gather data for the next eight of the output partitions (e.g., partition 24 to 31). Implicit in this is that the intermediate vertices 411 have been assigned into partition groups (act 204 of FIG. 2).

For each input group, the data is then shuffled from the input vertices of that input group into the corresponding intermediate vertices in that group (act 203). FIG. 4C illustrates the running example during and after this shuffling. The shuffling operation (e.g. involving broadcast) is illustrated for the input group 421A as represented by the arrows flowing from each input vertex 401A through 401D to each intermediate vertex 411A through 411D for that input group. Similarly, the shuffling operating is illustrated for the input group 421L as represented by the arrows flowing from each input vertex 401SS through 401VV into each intermediate vertex 411SS through 411VV. The shuffling operation is not illustrated for the remaining input groups 421B through 421K, though similar per-input group shuffling occurs there as well.

The fact that data the intermediate vertices of the first partition group are filled with data of partitions 0 to 7 is symbolized by each of those intermediate vertices being filled with the Roman numeral I. The fact that data the intermediate vertices of the second partition group are filled with data of partitions 8 to 15 is symbolized by each of those intermediate vertices being filled with the Roman numeral II. The fact that data the intermediate vertices of the third partition group are filled with data of partitions 16 to 23 is symbolized by each of those intermediate vertices being filled with the Roman numeral III. The fact that data the intermediate vertices of the fourth partition group are filled with data of partitions 24 to 31 is symbolized by each of those intermediate vertices being filled with the Roman numeral IV.

Now, for each partition group, the data from the intermediate vertices of those partition groups are shuffled into the output vertices for those partition groups (act 205). Here is where recursion comes in. Note that for the first partition group corresponding to partitions 0 to 7, there are twelve intermediate nodes (filled with Roman numeral I). There will also be eight output vertices, one for each of partitions 0 to 7. The fan-in factor remains four. Thus, the second level of recursion may be entered for the first partition group, with the intermediate nodes for the first level of recursion being treated as the input vertices for the second level of recursion. Similar second level recursions may occur for each of the intermediate nodes of the second partition group, the intermediate nodes of the third partition group, and the intermediate nodes of the fourth partition group. The net result is that there would be not be more than the fan-in factor number of transmitting vertices being transmitted into each receiving vertex—at any point. Of course, there may be three or more levels of recursion as needed to accomplish this giving the number of input vertices, the number of partitions, and the fan-in factor.

This method of shuffling controls the number of vertices that are shuffling into any given vertex to be below a certain level (e.g., below a configurable fan-in number). Accordingly, inefficiencies and reliability problems associated with having too much fan-in is reduced. Such inefficiencies include the allocation of significant memory in the receiving vertex to handle incoming data streams, the increased change that the receiving of the data stream for one or more transmitting vertices will fail resulting in the receiving vertex restarting the process, the exacerbation of merge operation bottlenecks, and so forth. This improved efficiency is accomplished even with the use of a more restricted number of intermediate nodes that scales approximately linearly with the number of input and output vertices. Thus, shuffling may be reliably and efficiently performed even on big data as the amount of data being shuffled increase more and more into the future.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more hardware processors; and
one or more computer-readable media having thereon computer-executable instructions that are structured such that, when executed by the one or more processors, cause the computing system to perform steps for shuffling data accessible by a first set of vertices into partitions corresponding to a second set of vertices, the steps comprising:
assigning the first vertices into a plurality of groups of first vertices such that each vertex is assigned to only one of the plurality of groups;
assigning a plurality of intermediate vertices to the plurality of groups of first vertices, each vertex assigned to only one of the plurality of groups of first vertices and corresponding to multiple of the partitions, such that each group of first vertices has a corresponding set of intermediate vertices, and such that each of the partitions has at least one corresponding intermediate vertex within the corresponding set of intermediate vertices assigned to each group of first vertices;
for each group of first vertices, shuffling the data from the first vertices of the corresponding group of first vertices into the corresponding set of intermediate vertices for that group of first vertices, such that each of the intermediate vertices in the corresponding set of intermediate vertices for that group of first vertices has data for its corresponding multiple partitions;
grouping the intermediate vertices into groups such that each of the intermediate vertices in a group has data for the same corresponding multiple partitions; and
for each group of intermediate vertices that corresponds to a same corresponding multiple partitions, shuffling the data from each vertex in that group of intermediate vertices into each of multiple corresponding second vertices such that each second vertex has data for an assigned partition of the same corresponding multiple partitions.

2. The computing system in accordance with claim 1, the act of assigning the first vertices into a plurality of groups of first vertices comprising:
assigning the first vertices into groups of equal or approximately equal size, the size.

3. The computing system in accordance with claim 2, the size of each of the plurality of groups being determined by a configurable fan-in factor, and being equal to or approximately equal to the configurable fan-in factor.

4. The computing system in accordance with claim 3, for each group of first vertices, the act of shuffling the data from the first vertices of the corresponding group of first vertices into the corresponding set of intermediate vertices for that group of first vertices comprising:
for each of the first vertices into corresponding group of first vertices, broadcasting data from the first vertex to each of the intermediate vertices in the corresponding set of intermediate vertices for that group of first vertices.

5. The computing system in accordance with claim 4, wherein for each of at least one group of intermediate vertices that correspond to a set of like multiple partitions, the act of shuffling the data from that group of intermediate vertices into each of multiple corresponding second vertices such that each second vertex has data for an assigned partition comprises:
recursively performing the steps of claim 4 on the act of shuffling the data from the intermediate vertices until a size of each subgroup of intermediate vertices is at or below the configurable fan-in factor, such that any subgroup of intermediate vertices that directly shuffles data into the multiple corresponding second vertices is no larger than the configurable fan-in factor.

6. The computing system in accordance with claim 4, wherein for each of the groups of intermediate vertices that correspond to a set of like multiple partitions, the act of shuffling the data from that group of intermediate vertices into each of multiple corresponding second vertices such that each second vertex has data for an assigned partition comprises:
recursively performing the steps of claim 4 on the act of shuffling the data from the intermediate vertices until a size of each subgroup of intermediate vertices is at or below the configurable fan-in factor, such that any subgroup of intermediate vertices that directly shuffles data into the multiple corresponding second vertices is no larger than the configurable fan-in factor.

7. The computing system in accordance with claim 1, wherein for each of at least one group of intermediate vertices that correspond to a set of like multiple partitions, the act of shuffling the data from that group of intermediate vertices into each of multiple corresponding second vertices such that each second vertex has data for an assigned partition comprises:
recursively performing the steps of claim 1 on the act of shuffling the data from the intermediate vertices until a size of each subgroup of intermediate vertices is at or below a particular size, such that any subgroup of intermediate vertices that directly shuffles data into the multiple corresponding second vertices is no larger than the particular size.

8. The computing system in accordance with claim 1, wherein for each of the groups of intermediate vertices that correspond to a set of like multiple partitions, the act of shuffling the data from that group of intermediate vertices into each of multiple corresponding second vertices such that each second vertex has data for an assigned partition comprises:
recursively performing the steps of claim 1 on the act of shuffling the data from the intermediate vertices until a size of each subgroup of intermediate vertices is at or below a particular size, such that any subgroup of intermediate vertices that directly shuffles data into the multiple corresponding second vertices is no larger than the particular size.

9. The computing system in claim 1, wherein for each of at least one group of intermediate vertices that correspond to a set of like multiple partitions, the act of shuffling the data from that group of intermediate vertices into each of multiple corresponding second vertices such that each second vertex has data for an assigned partition comprises:
assigning the group of intermediate vertices into a plurality of subgroups of intermediate vertices;
assigning a second plurality of intermediate vertices, each of the second intermediate vertices corresponding to one of the plurality of subgroups of first intermediate vertices and corresponding to multiple of the partitions, such that each subgroup of intermediate vertices has a corresponding set of the second plurality of intermediate vertices, and such that each of all of the partitions corresponding to the group of intermediate vertices has a corresponding intermediate vertex within the corresponding set of the second plurality of intermediate vertices for the corresponding subgroup of intermediate vertices;

for each subgroup of the intermediate vertices, shuffling the data from the intermediate vertices of the corresponding subgroup of intermediate vertices into the corresponding set of the second plurality of intermediate vertices for that subgroup of intermediate vertices, such that each of the intermediate vertices in the corresponding set of the second plurality intermediate vertices for that subgroup of intermediate vertices has data for its corresponding multiple partitions; and for each group of intermediate vertices of the second plurality of intermediate vertices that correspond to a set of like multiple partitions, shuffling the data from that group of intermediate vertices of the second plurality of intermediate vertices into each of multiple corresponding second vertices such that each second vertex has data for an assigned partition.

10. A method for shuffling data accessible by a first set of vertices into partitions corresponding to a second set of vertices, the method comprising:

assigning the first vertices into a plurality of groups of first vertices such that each vertex is assigned to only one of the plurality of groups;

assigning a plurality of intermediate vertices to the plurality of groups of first vertices, each intermediate vertex assigned to only one of the plurality of groups of first vertices and corresponding to multiple of the partitions, such that each group of first vertices has a corresponding set of intermediate vertices, and such that each of the partitions has at least one corresponding intermediate vertex within the corresponding set of intermediate vertices assigned to each group of first vertices;

for each group of first vertices, shuffling the data from the first vertices of the corresponding group of first vertices into the corresponding set of intermediate vertices for that group of first vertices, such that each of the intermediate vertices in the corresponding set of intermediate vertices for that group of first vertices has data for its corresponding multiple partitions;

grouping the intermediate vertices into groups such that each of the intermediate vertices in a group has data for the same corresponding multiple partitions; and for each group of intermediate vertices that corresponds to a same corresponding multiple partitions, shuffling the data from each vertex in that group of intermediate vertices into each of multiple corresponding second vertices such that each second vertex has data for an assigned partition of the same corresponding multiple partitions.

11. The method in accordance with claim 10, the act of assigning the first vertices into a plurality of groups of first vertices comprising:

assigning the first vertices into groups of equal or approximately equal size, the size.

12. The method in accordance with claim 11, the size of each of the plurality of groups being determined by a configurable fan-in factor, and being equal to or approximately equal to the configurable fan-in factor.

13. The method in accordance with claim 12, for each group of first vertices, the act of shuffling the data from the first vertices of the corresponding group of first vertices into the corresponding set of intermediate vertices for that group of first vertices comprising:

for each of the first vertices into corresponding group of first vertices, broadcasting data from the first vertex to each of the intermediate vertices in the corresponding set of intermediate vertices for that group of first vertices.

14. The method in accordance with claim 13, wherein for each of at least one group of intermediate vertices that correspond to a set of like multiple partitions, the act of shuffling the data from that group of intermediate vertices into each of multiple corresponding second vertices such that each second vertex has data for an assigned partition comprises:

recursively performing the method of claim 13 on the act of shuffling the data from the intermediate vertices until a size of each subgroup of intermediate vertices is at or below the configurable fan-in factor, such that any subgroup of intermediate vertices that directly shuffles data into the multiple corresponding second vertices is no larger than the configurable fan-in factor.

15. The method in accordance with claim 13, wherein for each of the groups of intermediate vertices that correspond to a set of like multiple partitions, the act of shuffling the data from that group of intermediate vertices into each of multiple corresponding second vertices such that each second vertex has data for an assigned partition comprises:

recursively performing the method of claim 13 on the act of shuffling the data from the intermediate vertices until a size of each subgroup of intermediate vertices is at or below the configurable fan-in factor, such that any subgroup of intermediate vertices that directly shuffles data into the multiple corresponding second vertices is no larger than the configurable fan-in factor.

16. The method in accordance with claim 10, wherein for each of at least one group of intermediate vertices that correspond to a set of like multiple partitions, the act of shuffling the data from that group of intermediate vertices into each of multiple corresponding second vertices such that each second vertex has data for an assigned partition comprises:

recursively performing the method of claim 10 on the act of shuffling the data from the intermediate vertices until a size of each subgroup of intermediate vertices is at or below a particular size, such that any subgroup of intermediate vertices that directly shuffles data into the multiple corresponding second vertices is no larger than the particular size.

17. The method in accordance with claim 10, wherein for each of the groups of intermediate vertices that correspond to a set of like multiple partitions, the act of shuffling the data from that group of intermediate vertices into each of multiple corresponding second vertices such that each second vertex has data for an assigned partition comprises:

recursively performing the method of claim 10 on the act of shuffling the data from the intermediate vertices until a size of each subgroup of intermediate vertices is at or below a particular size, such that any subgroup of intermediate vertices that directly shuffles data into the multiple corresponding second vertices is no larger than the particular size.

18. The method in claim 10, wherein for each of at least one group of intermediate vertices that correspond to a set of like multiple partitions, the act of shuffling the data from that group of intermediate vertices into each of multiple corresponding second vertices such that each second vertex has data for an assigned partition comprises:

assigning the group of intermediate vertices into a plurality of subgroups of intermediate vertices;

assigning a second plurality of intermediate vertices, each of the second intermediate vertices corresponding to one of the plurality of subgroups of first intermediate vertices and corresponding to multiple of the partitions, such that each subgroup of intermediate vertices has a corresponding set of the second plurality of intermediate vertices, and such that each of all of the partitions corresponding to the group of intermediate vertices has a corresponding intermediate vertex within the corresponding set of the second plurality of intermediate vertices for the corresponding subgroup of intermediate vertices;

for each subgroup of the intermediate vertices, shuffling the data from the intermediate vertices of the corresponding subgroup of intermediate vertices into the corresponding set of the second plurality of intermediate vertices for that subgroup of intermediate vertices, such that each of the intermediate vertices in the corresponding set of the second plurality intermediate vertices for that subgroup of intermediate vertices has data for its corresponding multiple partitions; and for each group of intermediate vertices of the second plurality of intermediate vertices that correspond to a set of like multiple partitions, shuffling the data from that group of intermediate vertices of the second plurality of intermediate vertices into each of multiple corresponding second vertices such that each second vertex has data for an assigned partition.

\* \* \* \* \*